United States Patent Office 2,951,851
Patented Sept. 6, 1960

2,951,851

PHOSPHORIC ESTERS OF SUBSTITUTED UMBELLIPHERONE

Raffaello Fusco, Giuseppe Losco, and Cesare Augusto Peri, Milan, Italy, assignors to Montecatini Società Generale per l'Industria Mineraria e Chimica, a corporation of Italy No Drawing. Filed Oct. 1, 1957, Ser. No. 687,377

Claims priority, application Italy Oct. 3, 1956

10 Claims. (Cl. 260—343.2)

This invention relates to a process for preparing phosphoric esters of substituted umbellipherone and pesticidal compositions obtained thereby.

The co-pending application Serial No. 577,204 of April 10, 1956, now U.S. Patent 2,860,085, issued November 11, 1958, of which this application is a continuation-in-part, discloses the preparation and use as pesticides of thiophosphoric esters of substituted umbellipherone of the general formula

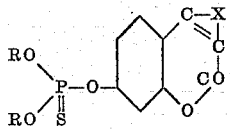

wherein R represents a lower alkyl and X represents a bivalent radical deriving from a straight or branched chain saturated hydrocarbon and forming, together with the carbon atoms in the 3- and 4-position, a penta- or hexa-atomic ring.

We have now discovered that other compounds of this general type can be prepared which show a high insecticidal activity. More specifically, these compounds include the following substitutions wherein:

(a) The phosphor bound sulfur atom in the foregoing formula may be replaced by oxygen;

(b) The carbon atoms in the 3- and 4-position form a ring with a saturated or unsaturated four carbon chain;

(c) The carbon atoms in the 3- and 4-position form a ring with a four-member hetero chain.

The new products of this type were found to be efficient pesticidal agents and are particularly useful in the control of the domestic fly, including those strains that have become resistant to the commonly used chlorinated insecticides. Other outstanding characteristics of this new class of materials are a high degree of permanency on treated walls and low toxicity for warm-blooded animals (as found from experiments with rats, after administration of given amounts of these materials per os or by intravenous injection).

The herein-claimed products are obtained by reacting a halide of an O,O-dialkyl-phosphoric or thiophosphoric acid of the general formula

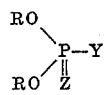

wherein R represents a lower alkyl, Y represents a halogen and Z represents sulfur or oxygen with a heterocyclic phenolic compound having the general formula

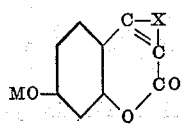

wherein X has the afore-mentioned meaning and M represents an alkali metal. Moreover, the same compound having a free phenol group can also be used, together with a basic metal compound which is sufficiently alkaline to bind the hydrohalogenic acid set free (e.g. alkali hydroxides, carbonates, bicarbonates, alcoholates).

The reaction is carried out in a solvent for one or both of the reactants. Depending upon whether the reaction product is solid or liquid, it is separated from the reaction liquid by filtration or extraction with a suitable solvent.

In addition, we found that thiophosphoric esters (wherein Z is sulfur) of this invention can be converted into the corresponding phosphoric esters (wherein Z is O) by applying suitable oxidants, for example hydrogen peroxide in an acetic medium.

The compounds of this invention may be employed in a number of ways: They may be suitably diluted or extended by mixing with liquid, semi-solid or solid carriers to form a dough, for example, with a semi-solid carrier; whereby various wetting, adhesive, dispersing and emulsifying agents may be added according to principles generally known in the art.

Moreover, these substances may be dispersed in the air by fumigation or in form of aerosols. Other pesticidal materials may be associated therewith.

The following examples are presented to illustrate the invention, without intention, however, to thereby limit the scope of the appended claims.

EXAMPLE 1

43.2 g. of finely powdered 3,4-tetramethylene-umbellipherone and 20 g. of finely powdered, anhydrous potassium carbonate are added to 200 cc. of acetone. After homogenization, 35 g. of O,O-diethyl-phosphoric acid chloride are introduced and the mixture is refluxed for 4 hours. The mixture is then cooled, 800 cc. of water are added and the oil which separates first is extracted with carbon tetrachloride.

After removal of the solvent by evaporation, the residue is left to crystallize. The solid product, recrystallized from ligroin, melts at 59–60° C. It consists of the O,O-diethyl-phosphoric ester of 3,4-tetramethylene-umbellipherone.

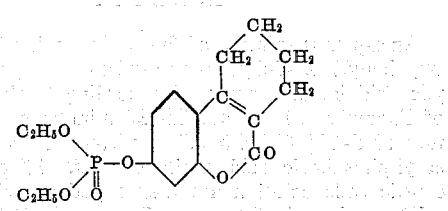

EXAMPLE 2

70 cc. of 30% hydrogen peroxide are gradually added to a solution of 36 g. of 3,4-tetramethylene-umbellipherone-O,O-diethylthiophosphate in 100 cc. of glacial acetic acid, heated to 93° C. The mixture is heated on water-bath for 30 minutes and, after cooling, is poured into water. The oil which separates is dissolved in benzene and the solution is treated, while stirring, first with an aqueous 5% caustic soda solution and then with water. Removal of the solvent yields a solid residue which, after crystallization from ligroin, melts at 59–60° C. It consists of the same O,O-diethyl-phosphoric ester of 3,4-tetramethylene-umbellipherone as in Example 1.

EXAMPLE 3

6.2 g. of 7-oxy-3,4-benzocoumarin and 3 g. of finely powdered potassium carbonate are added to 40 cc. of acetone. The mixture is vigorously stirred for 15 minutes at 40–45° C. and 6 g. of O,O-diethyl-phosphoric acid chloride are added. This mixture is kept boiling for 3 hours, while vigorously stirring. After cooling, there are first added 250 cc. of water, and then 35 cc. of a 3% caustic soda solution. The solid material which separates is collected on a filter, thoroughly washed with water, and then crystallized from a benzene-ligroin mixture (1:1) to yield a product having a melting point of 103° C. and representing the O,O-diethyl-thiophosphoric ester of 7-hydroxy-3,4-benzocoumarin having the graphic formula

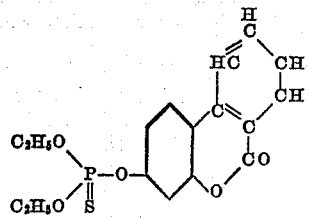

EXAMPLE 4

9.36 g. of the lactone of 4-(2'-hydroxy-4'-hydroxy-phenyl)-4,5-dehydro-tetrahydro-1-thiapyran-5-carboxylic acid are added to a solution of 1.6 g. of sodium hydroxide in 30 cc. of water. The mixture is stirred until complete dissolution takes place and 6.4 g. of O,O-dimethylthiophosphoric acid chloride are added. The mixture is kept at 25° C. for 2 and one-half hours, while vigorously stirring. 30 cc. of a 5% caustic soda solution are then added and the resulting solid product, after separation and crystallization from ethyl-alcohol, has a melting point of 100–101° C. and represents the lactone of 4(2'-hydroxy-O,O-dimethylthiophosphoryl-hydroxyphenyl)-4,5-dehydro-tetrahydro-1-thiapyran-5-carboxylic acid.

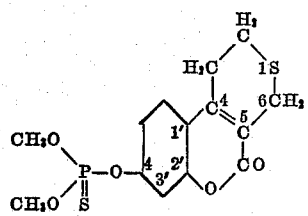

EXAMPLE 5

An aqueous solution of the sodium salt of 4(2'-oxy-4'-oxyphenyl)-4,5-dehydro-tetrahydro-1-thiapyran-5-carboxylic acid lactone, prepared according to the description of Example 4, is reacted for 30 minutes at the temperature of 5–10° C. with 6.8 g. of the chloride of O,O-diethyl-phosphoric acid, while stirring. 30 cc. of a 5% caustic soda solution are then added and the separated solid product is filtered and crystallized from methyl alcohol. The reaction product represents the lactone of 4(2'-hydroxy-4')O,O-diethyl-hydroxyphosphoryl-hydroxyphenyl)-4,5-dehydro-tetrahydro-1-thiapyran-5-carboxylic acid, M.P. 82–84° C.

EXAMPLE 6

9.4 g. of O,O-diethyl-phosphoric acid chloride are added to a solution of 12.3 g. of 4(2'-oxy-4'-oxyphenyl)-4,5-dehydro-tetrahydro-1-thiapyran-5-carboxylic acid lactone in 30 cc. of water. The mixture is heated to the boiling temperature for 20 minutes while vigorously stirring. After cooling, 40 cc. of a 5% caustic soda solution are added. The separated solid product is filtered and crystallized from ethyl alcohol. It consists of the lactone of 4(2'-oxy-4'-O,O-diethylthiophosphoryl-oxyphenyl)-4,5-dehydro-tetrahydro-1-thiapyran-5-carboxylic acid, M.P. 77–78° C.

Evaluation of the biological activity of the compounds described in the foregoing examples The herein-disclosed products show a generally high insecticidal action which makes them especially suitable for the control of parasites, particularly the house fly.

These characteristics are shown in detail in the following examples:

EXAMPLE 7

Upon topic application, with a micro-syring, of an acetone solution of the test product to 5-days old domestic flies, the following average percent mortalities were observed after 20 hours:

| γ/fly | 10 | 2 | 0.4 |
|---|---|---|---|
| | Percent mortality after 20 hours | | |
| O,O-diethyl-phosphoric ester of 3,4-tetramethylene-umbellipherone (Examples 1 and 2) | 100 | 100 | 92 |
| O,O-diethylthiophosphoric ester of 7-hydroxy-3,4-benzocoumarin (Example 3) | 97 | 65 | 32 |
| lactone of 4(2'-hydroxy-4'-O,O-dimethylthiophosphoryl-hydroxy-phenyl)-4,5-dehydro-tetrahydro-1-thiapyran-5-carboxylic acid (Example 4) | 72 | 29 | 5 |
| lactone of 4(2'-oxy-4'-O,O-diethyl-oxy-phosphoryl-hydroxyphenyl)4,5-dehydro-tetrahydro-1-thiapyran-5-carboxylic acid (Example 5) | 100 | 100 | 80 |
| lactone of 4(2'-oxy-4'-O,O-diethyl-thio-phosphoryl-hydroxyphenyl)4,5-dehydro-tetrahydro-1-thiapyran-5-carboxylic acid (Example 6) | 100 | 100 | 94 |

EXAMPLE 8

Through tharsal absorption, by introducing female flies 5-days old into beakers previously treated with checked amounts of benzene solutions of the active test substances and leaving the flies for 20 hours in contact with the material, the following mortalities have been ascertained:

| | active substance, g./m.² | Percent mortality after 20 h. |
|---|---|---|
| O,O-diethyl-phosphoric ester of 3,4-tetramethylene-umbellipherone. | 0.125 | 100 |
| | 0.025 | 95 |
| O,O-diethylthiophosphoric ester of 7-oxy-3,4-benzocoumarin. | 0.125 | 100 |
| | 0.025 | 75 |
| lactone of 4(2'-hydroxy-4'-O,O-dimethyl-phosphoryl-hydroxyphenyl)4,5-dehydro-tetrahydro-1-thiapyran-5-carboxylic acid. | 0.125 | 16 |
| | 0.025 | 7 |
| lactone of 4(2'-hydroxy-4'-O,O-diethyl-hydroxyphosphoryl-hydroxy-phenyl)4,5-dehydro-tetrahydro-1-thiapyran-5-carboxylic acid. | 0.125 | 94 |
| | 0.025 | 84 |
| lactone of 4(2'-hydroxy-4'-O,O-diethyl-thionophosphoryl-hydroxy-phenyl)-4,5-dehydro-tetrahydro-1-thiapyran-5-carboxylic acid. | 0.125 | 93 |
| | 0.025 | 69 |

We claim:

1. The pesticidal, O,O-diethylthiophosphoric ester of 7-hydroxy-3,4-benzo-coumarin, having the graphic formula

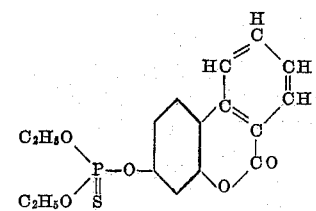

2. The lactone of 4-(2'-hydroxy-4'-O,O-dimethylthiophosphoryl-hydroxyphenyl) - 4,5 - dehydro-tetrahydro-1-thiapyran-5-carboxylic acid, having the formula

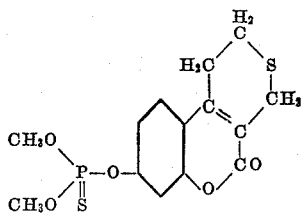

3. The lactone of 4-(2'-hydroxy-4'-O,O-diethylhydroxyphosphoryl - hydroxyphenyl) - 4,5 - dehydro-tetrahydro-1-thiapyran-5-carboxylic acid, having the formula

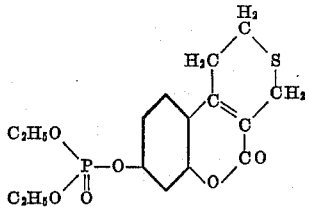

4. The lactone of 4-(2'-hydroxy-4'-O,O-diethylthiophosphoryl-hydroxyphenyl) - 4,5 - dehydro-tetrahydro-1-thiapyran-5-carboxylic acid, having the formula

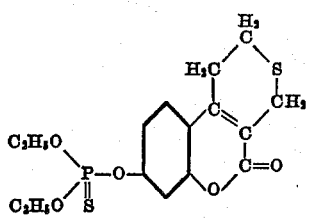

5. A pesticidal compound taken from the group consisting of phosphoric and thiophosphoric esters of the formula:

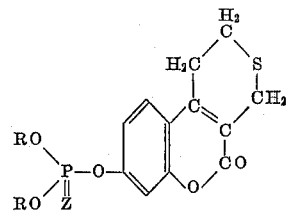

in which R is a lower alkyl and Z is a member of the group consisting of oxygen and sulfur.

6. A pesticidal compound defined in claim 5 in which R is methyl.

7. A pesticidal compound defined in claim 5 in which R is ethyl.

8. A pesticidal compound taken from the group consisting of O,O-di(lower alkyl)thiophosphoric and phosphoric esters of 7-hydroxy-3,4-benzo-coumarin.

9. A pesticidal compound as defined in claim 8, the lower alkyl being methyl.

10. A pesticidal compound as defined in claim 8, the lower alkyl being ethyl.

References Cited in the file of this patent

UNITED STATES PATENTS

| | | |
|---|---|---|
| 2,624,745 | Schrader | Jan. 6, 1953 |
| 2,815,312 | Schuler | Dec. 3, 1957 |
| 2,857,304 | Birum | Oct. 21, 1958 |

OTHER REFERENCES

Chem. Abst., vol. 48, p. 11711h, 1954.